United States Patent
Broer et al.

(10) Patent No.: US 6,177,216 B1
(45) Date of Patent: Jan. 23, 2001

(54) COLOR FILTER LAYER OF CHOLESTERICALLY ORDERED MATERIAL, AND REFLECTIVE LCD PROVIDED WITH SUCH A COLOR FILTER LAYER

(75) Inventors: Dirk J. Broer; Grietje N. Mol; Frans Leenhouts, all of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/450,233

(22) Filed: Nov. 29, 1999

(30) Foreign Application Priority Data

Dec. 1, 1998 (EP) .................................................. 98204054

(51) Int. Cl.[7] ............................ G02B 5/20; G02F 1/1335
(52) U.S. Cl. ................................. 430/7; 349/106; 349/115
(58) Field of Search .................................. 430/7; 349/106, 349/115

(56) References Cited

U.S. PATENT DOCUMENTS

| | | | |
|---|---|---|---|
| 5,506,704 | 4/1996 | Broer et al. | 359/63 |
| 5,682,212 * | 10/1997 | Maurer et al. | 349/5 |
| 5,683,622 * | 11/1997 | Krätzschmar et al. | 252/299.01 |
| 5,793,456 | 9/1998 | Broer et al. | 349/98 |

FOREIGN PATENT DOCUMENTS

0600349A1   6/1994   (EP) .
7-239471 *  9/1995   (JP) .

* cited by examiner

*Primary Examiner*—John A. McPherson
(74) *Attorney, Agent, or Firm*—John C. Fox

(57) ABSTRACT

The invention relates to a color filter layer of a cholesterically ordered material, in which the axis of the molecular helix is directed perpendicularly to said layer. According to the invention, the color filter layer comprises at least one dye which is able to absorb undesired colors caused by color shifts. A correct choice of the bandwidth of the primary colors of the color filter layer and the dyes significantly alleviates the problem of undesired color shift. The invention also relates to a liquid crystal color display device of the reflective type, which is provided with such a color filter layer.

10 Claims, 4 Drawing Sheets

COLOR FILTER LAYER OF CHOLESTERICALLY ORDERED MATERIAL, AND REFLECTIVE LCD PROVIDED WITH SUCH A COLOR FILTER LAYER

BACKGROUND OF THE INVENTION

The invention relates to a color filter layer of a cholesterically ordered material, in which the axis of the molecular helix of the cholesterically ordered material extends transversely to the layer. The invention also relates to a liquid crystal color display device of the reflective type, provided with such a color filter layer.

Color filter layers, also referred to as cholesteric mirrors, are known per se. They comprise a relatively thin layer of a liquid crystalline material having a cholesteric (or chirally nematic) order. The liquid crystalline molecules of this material have such a structure that they order to a spiral or helix-like structure in a solution—spontaneously or under the influence of given doping agents. After such a solution has been provided between two parallel substrates, this helix-like structure is aligned in such a way that the axis of the molecular helix extends transversely to the layer thus obtained. A better alignment of the helix is obtained if an orientation layer is provided on the facing surfaces of the substrates.

When unpolarized light is incident on such a color filter layer, that part of the light which "fits" the (dextrorotatory or levorotatory) direction and pitch of the helix is reflected, whereas the rest of the incident light is transmitted. If desired, this transmitted light is absorbed on an absorption layer which is present behind the color filter layer. The (reflected) color of the layer is mainly determined by the pitch of the cholesterically ordered material. Such filter layers may be used as coating layers or as mirror layers, for example for decorative purposes.

The known color filter layers have a major drawback. It appears that the color (=reflection band) of the color filter is strongly dependent on the angle at which the filter is viewed. This phenomenon is known as color shift. This color shift is caused by the strong angle-dependent anisotropic properties of the cholesterically ordered material. Such a color shift is unacceptable in a large number of applications.

OBJECTS AND SUMMARY OF THE INVENTION

It is an object of the invention to obviate the above-mentioned problem. More particularly, it is an object of the invention to provide a color filter layer in which there is hardly any or no color shift.

These and other objects of the invention are achieved by means of a color filter layer of the type described in the opening paragraph which, according to the invention, is characterized in that the color filter layer comprises at least one or more dyes which absorb unwanted colors caused by color shifts.

Due to the presence of one or more dyes in the color filter layer, unwanted colors can be absorbed. This inhibits color shift of the filter. The dye(s) should therefore preferably be chosen to be such that its (their) absorption wavelength(s) correspond(s) to the wavelength(s) of the unwanted color(s). Per desired color (=reflection band) two dyes are preferably present in the filter. The absorption band of both dyes should have at least some overlap with both edges of the reflection band of the cholesterically ordered material. A filter of this type has the important advantage that also the intensity of the color does not have any angle dependence. It will be evident that in this case a single dye having two or more absorption bands may also be used.

A favorable embodiment of the color filter layer according to the invention is characterized in that the cholesterically ordered material comprises a polymer network. Such a network consists of a polymer material having a three-dimensional structure. At least a part of the liquid crystalline molecules present in the layer is preferably incorporated in the network. The presence of such a network causes the reflection characteristic of the color filter to be relatively insensitive to mechanical tensions and temperature changes.

A further preferred embodiment of the color filter layer according to the invention is characterized in that the pitch of the molecular helix is varied in such a way that the difference between the maximum pitch and the minimum pitch is at least 20 nm. Cholesteric color filter layers ordered in such a way have a relatively broad reflection band which, dependent on the refractive indices of the layer, may have a width of 80 nm or more. The possibility of adjusting the width of the reflection band provides great advantages in the eventual color setting of the color filter. The pitch difference is preferably 50 nm or more. U.S. Pat. Nos. 5,506,704 and 5,793,456 in the name of the applicant describe a method of manufacturing such a broadband color filter.

A further preferred embodiment of the color filter layer according to the invention is characterized in that the dye(s) is (are) incorporated in the network via chemical bonds. This measure promotes the stability and durability of the color filter layer according to the invention. Separating one or more of the dyes from the cholesterically ordered layer (for example, by phase separation) is thereby inhibited.

The invention also relates to a liquid crystal color display device of the reflective type, provided with such a color filter layer. More particularly, the invention relates to a liquid crystal color display device of the reflective type, comprising two substantially parallel substrates provided with an electrode layer and an orientation layer between which a layer of liquid crystalline material is present, one substrate being provided with a broadband absorption layer, a patterned color filter layer of cholesterically ordered material, and a ¼λ layer, and the other substrate being provided with a polarizer.

Display devices of the type described above are known. For example, FIGS. 3 and 4 of European patent application EP-A 600 349 show two such display devices. In principle, display devices of the reflective type do not require any backlight. Consequently, the reflective display devices have a relatively low energy consumption.

The operation of a liquid crystal color display device of the reflective type with a cholesteric color filter is based on the following principle. An incident ray of light of unpolarized white light is polarized by the polarizer to linearly polarized light and is subsequently incident on a pixel of the LC material. If this pixel is not driven by means of an electric voltage, the light ray passes through the LC material and its direction of polarization is rotated, for example 90°. Subsequently, upon passing through the ¼λ layer behind this material, it is converted into levo-circularly polarized light.

The part of this polarized light having a wavelength outside the reflection band of the color filter layer of the ordered cholesteric material completely passes through the color filter layer and is absorbed in the broadband absorption layer. The part of the light having a wavelength within the reflection band of the color filter layer is, however, completely reflected on the color filter layer. Upon passage through the ¼λ layer, the direction of polarization is converted again into levo linearly polarized light. The direction of polarization of the light ray is again rotated in the layer of LC material, for example 90° again, but now in the opposite direction so that the total rotation is 0°. As a result, this light ray has the correct direction of polarization for passing through the polarizer. A viewer now sees the reflection color of the color filter layer of the relevant pixel.

The color filter layer consists of a pattern of three types of pixels associated with cholesteric materials having different reflection bands. It is possible to manufacture liquid crystal color display devices of the reflective type with such filters. When driving the pixel, the direction of polarization of the linearly polarized light is not rotated in the LC material. Upon passage through the ¼λ layer, the direction of polarization is now converted into dextro-circularly polarized light. The color filter reflects exclusively levo-circularly polarized light of a given wavelength. The presented dextro-circularly polarized light is fully passed and absorbed in the absorption layer so that nothing of this light reaches the viewer. The viewer thus "sees" a black pixel.

Liquid crystal color display devices of the reflective type have a major drawback. When watching such display devices, color shifts soon take place if a viewer does not watch the device from a substantially perpendicular direction.

It is an object of the invention to overcome the above-mentioned drawback. More particularly, it is an object of the invention to provide a liquid crystal color display device of the reflective type in which the color shift problem is considerably alleviated.

These and other objects of the invention are achieved with a liquid crystal color display device of the reflective type as mentioned in the opening paragraph, and is characterized in that the color filter layer also comprises one or more dyes which absorb unwanted colors caused by color shifts.

The invention is based on the recognition that the presence of dyes in or near the color filter layer can absorb the unwanted colors leaving the device at an oblique angle. It has been found that, if the device is viewed at an oblique angle, the wavelength of the relevant pixel shifts to a smaller wavelength. By suitable choice of the bandwidth of the primary colors from the color filter layer and the dyes, the problem of unwanted color shift is alleviated considerably.

The dye(s) is (are) preferably chosen to be such that an edge of the absorption band of one or more of the dyes coincides exactly or substantially exactly with an edge of the reflection band of the relevant pixel. Usually, a cholesteric material with a reflection band between 610 and 670 nm is used for the red color, a cholesteric material with a reflection band between 490 and 540 nm is used for the green color, and a cholesteric material with a reflection band between 435 and 475 nm is used for the blue color. Since the color shift only tends towards smaller wavelengths, the dye(s) should in this case be chosen to be such that the absorption band edge with the greatest wavelength substantially coincides with 610 nm (red), 490 nm (green) and 435 nm (blue).

The filter preferably comprises two dyes per desired reflection band. The absorption band of both dyes should have at least some overlap with both edges of each reflection band of the cholesterically ordered material. A filter of this type has the major drawback that also the intensity of the color does not have any angle dependence. It will be evident that fewer than six dyes may be used in this case if one or more of these dyes has two or more absorption bands.

In principle, it is possible to provide the dyes as a separate, patterned layer directly on the color filter layer. A preferred embodiment of the display device according to the invention is, however, characterized in that the dyes are mixed with the cholesterically ordered material of the patterned color filter layer. From a production-technical point of view, the provision of such a mixed layer of cholesteric material with a dye has obvious advantages.

A further preferred embodiment of the display device according to the invention is characterized in that the cholesterically ordered material of the color filter layer is polymerized to a polymeric network, in which the difference of pitch length of the cholesteric helix is at least 20 nm. In this case, it is possible to choose the bandwidth of the reflection band to be broader than the "window" provided by the dyes used.

A favorable embodiment of the display device according to the invention is characterized in that the cholesterically ordered material has a focal-conic texture. In this texture, the average direction of the cholesteric helix is transverse to the color filter layer, but there is a certain spread of the angle at which the individual helices extend to the angle with said layer. Consequently, instead of a specular reflection of the incident light, a diffuse reflection is obtained. This contributes to the image quality and the viewing angle dependence of the display device. Said focal-conic texture may be obtained by giving the surface of the color filter layer a special treatment. However, this stabilization is preferably achieved by incorporating the dyes in the form of dispersed pigments in the color filter layer.

A further advantageous embodiment of the display device according to the invention is characterized in that the dyes are incorporated in the network via chemical bonds. This has the advantage that the durability and stability of the color filter layer are improved. Separation of one or more dyes from the cholesterically ordered layer is thereby prevented.

These and other aspects of the invention are apparent from and will be elucidated with reference to the embodiments described hereinafter.

It is to be noted that, for the sake of clarity, the Figures are not drawn to scale.

DESCRIPTION OF THE PREFERRED EMBODIMENTS

Figure 1:
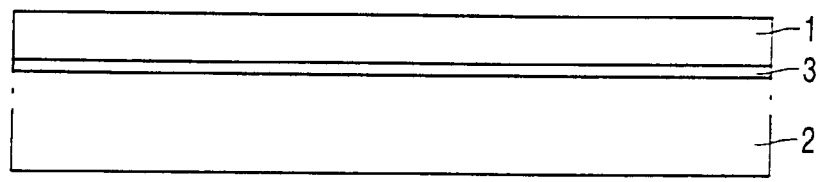
FIG. 1 is a diagrammatic cross-section of a color filter layer according to the invention.
Figure 2A:
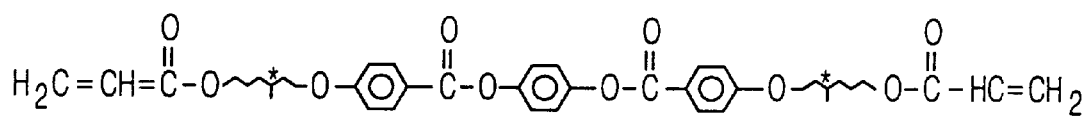
FIG. 2 shows the chemical structure formulas of a number of compounds used within the scope of the invention.
Figure 2B:
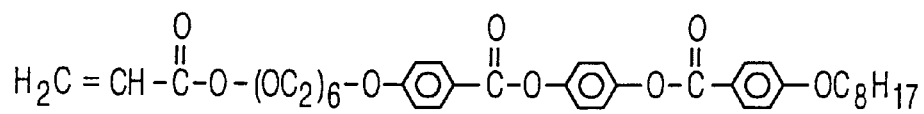
Figure 2C:
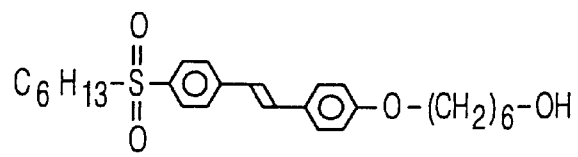
Figure 2D:
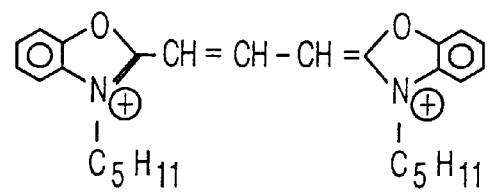
Figure 2E:
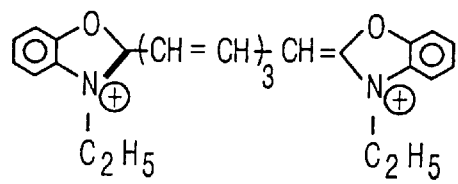
Figure 2F:
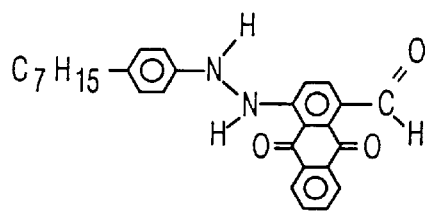
Figure 2G:
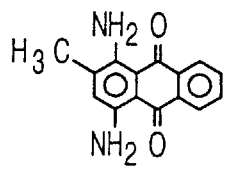
Figure 2H:
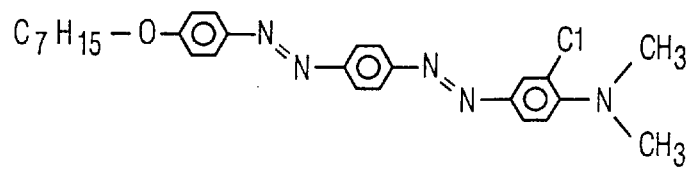
Figure 2I:
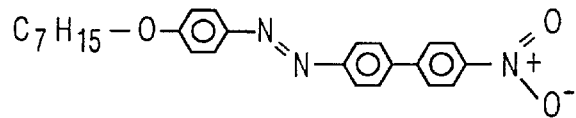

FIG. 1 is a diagrammatic cross-section of a color filter layer according to the invention. It comprises a layer 1 of a cholesterically ordered material in which the axis of the molecular helix of the cholesteric material extends transversely to the layer. The cholesterically ordered material comprises a polymer network and two dyes. The cholesterically ordered layer is provided on a substrate 2 of, for example, glass or metal, which is provided with an orientation layer 3 of rubbed polyimide. If desired, the substrate may alternatively consist of a flexible material, for example a synthetic material.

The color filter layer shown in FIG. 1 was manufactured as follows. The method started from a mixture of two reactive monomers consisting of 50% by weight of the chiral monoacrylate A and 50% by weight of the achiral diacrylate B. Added to this mixture were: 0.7% by weight of an UV-absorbing dye C (Abs max at 334 nm), 0.25% by weight of dye D (Abs max at 485 nm) and 0.25% by weight of of dye E (Abs max at 682 nm). Furthermore, 0.6% by weight of the photoinitiator Irgacure 651 (Ciba Geigy) and 40 ppm of the stabilizer p-methoxyphenol were added to the mixture. The chemical structure formulas of said compounds are shown in FIG. 2.

A quantity of the mixture thus manufactured was introduced between two substantially parallel glass substrates spaced apart by approximately 15 $\mu$m. The facing surfaces of the substrates were provided with an orientation layer of rubbed polyimide. Subsequently, the reactive mixture was polymerized by means of UV light (365 nm, $I_O$=0.05 mW/cm$^2$) at room temperature for approximately 10 minutes. During this polymerization, a relatively broadband color filter layer having a three-dimensional polymer network was obtained. Finally, one of the two substrates was removed.

Figure 3:
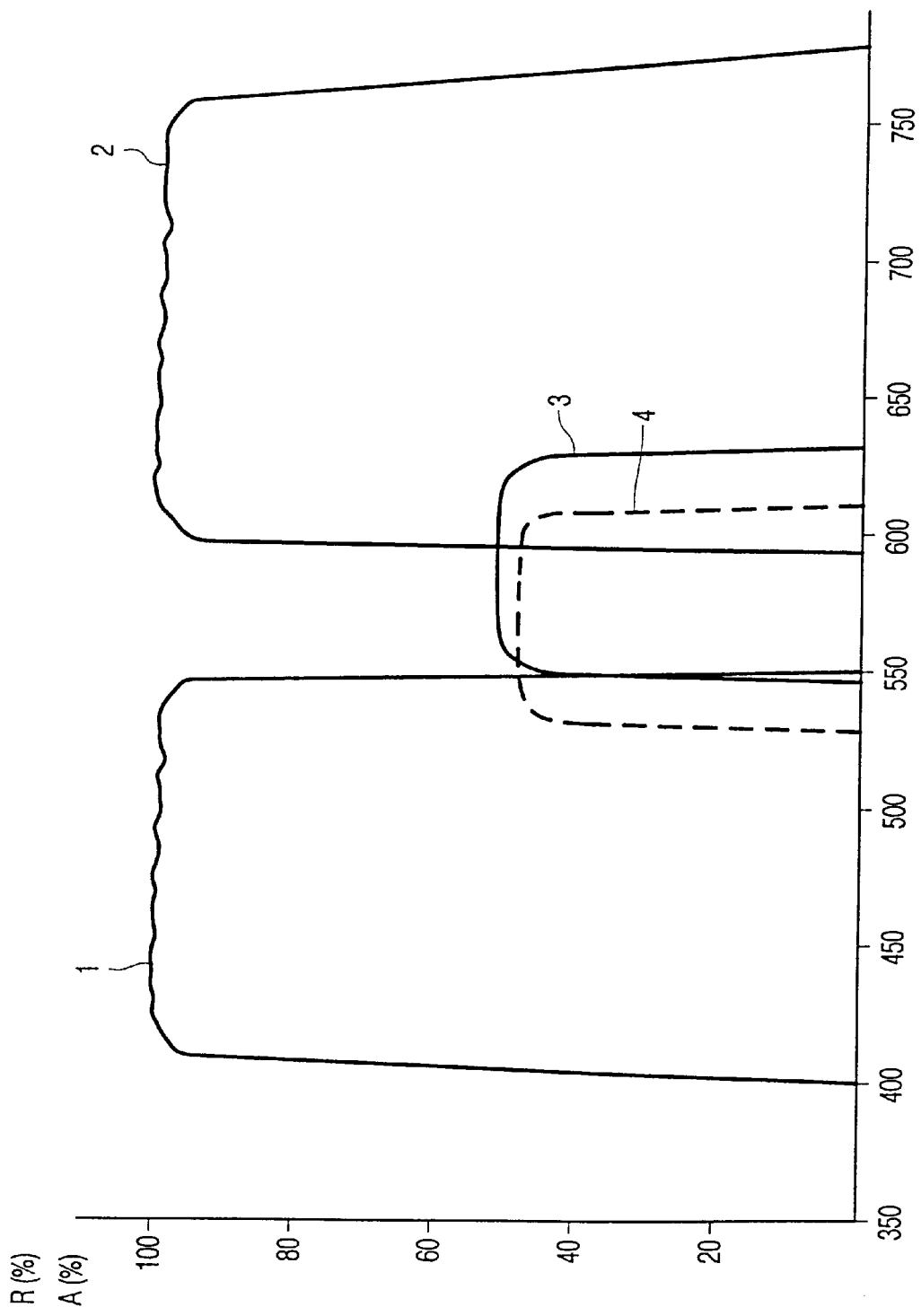
FIG. 3 shows diagrammatically some spectra of a color filter layer as shown in FIG. 1.

FIG. 3 shows diagrammatically a combination of the absorption spectrum and the reflection spectrum of the color filter layer described hereinbefore. The reference numerals 1 and 2 denote the absorption spectra of the dyes D and E. They leave open a relatively narrow transmission range between approximately 545 nm and 588 nm. The reference numeral 3 denotes the reflection spectrum of the cholesterically ordered material of the color filter layer for unpolarized light. This was measured perpendicularly to the layer in the absence of the dyes D and E. The reflection spectrum has a bandwidth of approximately 80 nm and ranges from 543 nm to 625 nm. Due to the presence of said dyes, the color filter layer actually reflects only light in the range between 545 nm and 588 nm. The visible light outside this range is absorbed by the dyes D and E.

The reference numeral 4 denotes the reflection spectrum of the cholesterically ordered material of the color filter layer for unpolarized light. This was measured at an angle of 45° under the normal of the layer and in the absence of the dyes D and E. Under these circumstances, the entire reflection spectrum has moved to a lower wavelength and now ranges between approximately 525 nm and 608 nm. The bandwidth remains approximately equal (80 nm). Due to the presence of said dyes, the color filter layer now actually also reflects only light in the range between 545 nm and 588 nm. The visible light outside this range is absorbed by the dyes D and E.

In the absence of the dyes D and E, the viewer would observe a clear color shift if he viewed the color filter layer at different angles. The presence of the dyes and the position of their absorption spectra with respect to the reflection spectrum of the color filter layer have the result that this color shift does not occur. The intensity of the filter also remains equal because there is a considerable overlap between said reflection spectrum and dye E at the edge and at the highest wavelength.

Figure 4:
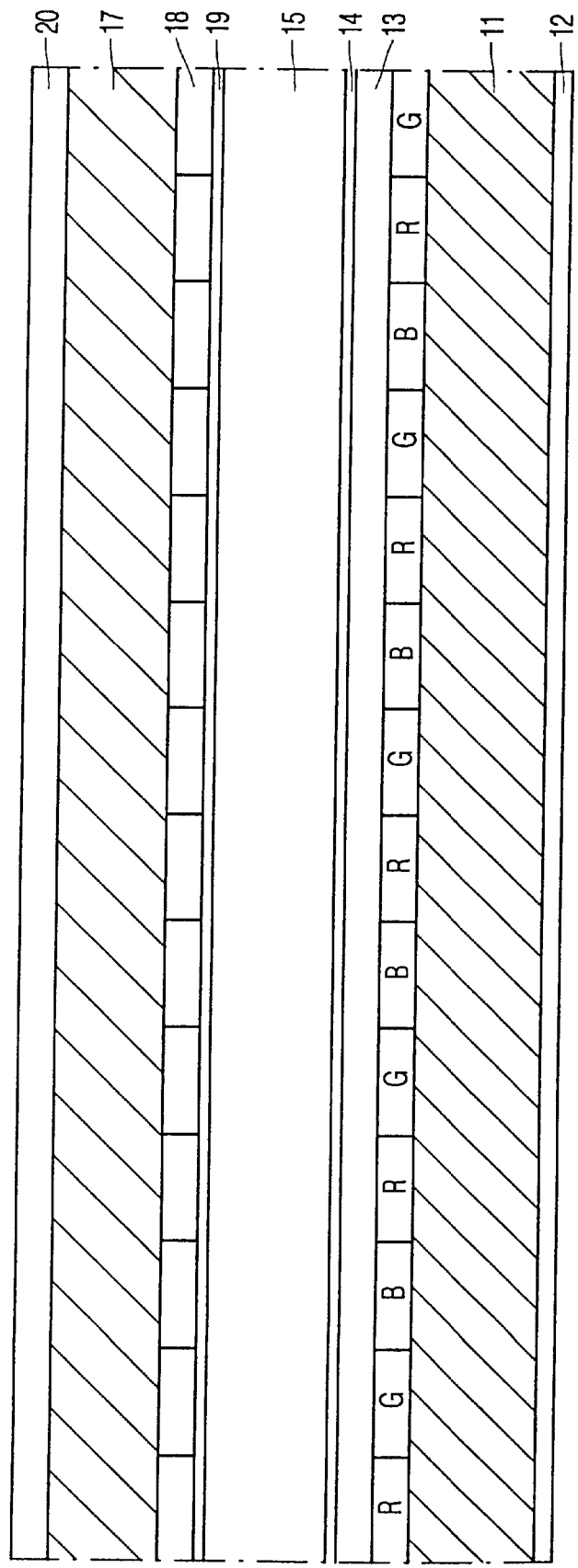
FIG. 4 is a diagrammatic cross-section of a liquid crystal color display device of the reflective type according to the invention.

FIG. 4 is a diagrammatic cross-section of a liquid crystal color display device of the reflective type according to the invention. It comprises a transparent substrate 11 of, for example glass, a surface of which is provided with a black absorbing layer 12, for example of a black lacquer. The other surface is provided with a thin orientation layer (not shown) on which a pattern of red (R), green (G) and blue (B) color filters is provided. In the relevant case, each filter consists of a layer polymerized to a three-dimensional network having a thickness of approximately 5 $\mu$m of cholesterically ordered liquid crystalline material having the wavelength associated with the desired color, and at least one dye.

Subsequently, a ¼λ retardation layer (not shown) of approximately 1 $\mu$m thickness is provided on the color filter layer thus formed, dependent on the birefringence of the liquid crystalline material. This retardation layer may be made of a uniaxially nematic liquid crystalline material or of a glass-forming liquid crystalline material. An orientation layer of rubbed polyimide is used for aligning this layer which can be provided by means of spin-coating.

An electrode layer 13 of transparent material is provided on the retardation layer. Good results are achieved with ITO-like materials which can be provided in patterns by means of sputtering. An orientation layer 14 for orienting the layer 15 of liquid crystalline material to be switched is present on this electrode layer. This orientation layer is present between the above-mentioned substrate 11 and a second transparent substrate 17 which may also be made of glass. This substrate is also provided with an electrode layer 18 and an orientation layer 19.

The rows of electrodes of the electrode layers 13 and 18 jointly constitute an electrode array with which small areas (pixels) of a layer 15 can be driven via an electric field. The size of these areas approximately corresponds to the size of the smallest dimensions of the patterned color filter layer.

The liquid crystal color display device shown in FIG. 4 also comprises a polarizer layer 20. This layer is provided on the surface of the substrate 17 remote from the substrate 11.

The color filter of the reflective display device according to the invention was manufactured as follows. A thin layer comprising the above-mentioned mixture of reactive acrylates with dyes was provided on the orientation layer on the substrate 11. The ratio between the two acrylates was chosen to be such that the desired reflection wavelength range was obtained. This is the range between approximately 610 nm and 670 nm for the red pixels, the range between approximately 490 and 540 nm for the green pixels and the range between approximately 435 and 475 nm for the blue pixels.

A small quantity (approximately 0.2% by weight) of one or two dyes having the desired absorption characteristic was added to these mixtures. In the relevant case, these were the compounds F and G for the red pixels, the compounds F and H for the green pixels and the compounds H and I for the blue pixels. The chemical structure formulas of the compounds F (Abs max at 392 nm), G (Abs max at 489 nm), H (Abs max at 590 and 637 nm) and I (Abs max at 539 nm) are shown in FIG. 2.

After a first layer was provided for, for example the red pixels, the layer was oriented by means of a matrix which was also provided with an orientation layer. Subsequently, pattern exposure took place. After removal of the unpolymerized material with 2-propanol, a second layer for, for example the green pixels was provided. It was provided with a matrix in the same manner and subjected to a pattern exposure. This method was finally repeated for providing the blue pixels. After the color filter layer has been provided, a thin planarization layer may be provided, if desired, before providing the retardation layer. Subsequently, an electrode layer and an orientation layer were consecutively provided on the retardation layer.

A display device was manufactured by means of the substrate thus obtained. A second substrate was provided with a polarizer, an electrode layer and an orientation layer as described with reference to FIG. 4 and a cell was formed which was filled with a liquid crystalline material. The extent of color shift was examined by viewing the different pixel colors of the cell, both perpendicularly to the cell and at an angle of 45°.

It has proved to be possible to considerably suppress the color shift, which usually occurs when viewing the device from different angles, with the liquid crystal color display device of the reflective type described hereinbefore.

What is claimed is:

1. A color filter layer of a cholesterically ordered material, in which the axis of the molecular helix of the cholesteric material extends transversely to the layer, characterized in that the color filter layer also comprises one or more dyes which absorb unwanted colors caused by color shifts.

2. A color filter layer as claimed in claim 1, characterized in that the cholesterically ordered material comprises a polymer network.

3. A color filter layer as claimed in claim 2, characterized in that the pitch of the molecular helix is varied in such a way that the difference between the maximum pitch and the minimum pitch is at least 20 nm.

4. A color filter layer as claimed in claim 2, characterized in that the dye(s) is (are) incorporated in the network via chemical bonds.

5. A liquid crystal color display device of the reflective type, comprising two substantially parallel substrates provided with an electrode layer and an orientation layer between which a layer of liquid crystalline material is present, one substrate being provided with a broadband absorption layer, a patterned color filter layer of cholesterically ordered material, and a ¼λ layer, and the other substrate being provided with a polarizer, characterized in that the color filter layer also comprises one or more dyes which absorb unwanted colors caused by color shifts.

6. A display device as claimed in claim 5, characterized in that the dyes are mixed with the cholesterically ordered material of the patterned color filter layer.

7. A display device as claimed in claim 5, characterized in that the cholesterically ordered material of the color filter layer is polymerized to a polymer network, with the difference between the maximum pitch and the minimum pitch of the molecular helix being at least 20 nm.

8. A display device as claimed in claim 7, characterized in that the dyes are incorporated in the network via chemical bonds.

9. A display device as claimed in claim 5, characterized in that the cholesterically ordered material has a focal-conic texture.

10. A display device as claimed in claim 9, characterized in that the dyes are incorporated in the form of dispersed segments in the color filter layer.

* * * * *